US006347257B1

(12) United States Patent
Bedal et al.

(10) Patent No.: US 6,347,257 B1
(45) Date of Patent: Feb. 12, 2002

(54) METHOD AND APPARATUS FOR CONTROLLING THE DROP VOLUME IN A SELECTIVE DEPOSITION MODELING ENVIRONMENT

(75) Inventors: Bryan J. L. Bedal, Santa Clarita; Loc V. Bui, Valencia, both of CA (US)

(73) Assignee: 3D Systems, Inc., Valencia, CA (US)

( * ) Notice: Subject to any disclaimer, the term of this patent is extended or adjusted under 35 U.S.C. 154(b) by 0 days.

(21) Appl. No.: 09/258,019

(22) Filed: Feb. 25, 1999

Related U.S. Application Data (63) Continuation-in-part of application No. 08/722,326, filed on Sep. 27, 1996, now Pat. No. 5,943,235, which is a continuation-in-part of application No. 08/534,813, filed on Sep. 27, 1995, now abandoned.

(51) Int. Cl.[7] .............................................. G06F 19/00
(52) U.S. Cl. ........................ 700/119; 700/118; 700/123
(58) Field of Search ................................ 700/119, 118, 700/123, 98, 80, 282, 283, 240; 264/308

(56) References Cited

U.S. PATENT DOCUMENTS

| | | | | |
|---|---|---|---|---|
| 4,563,689 A | | 1/1986 | Murakami et al. ............ 347/11 |
| 4,665,492 A | * | 5/1987 | Masters ...................... 700/119 |
| 5,121,329 A | * | 6/1992 | Crump ........................ 700/119 |
| 5,141,680 A | * | 8/1992 | Almquist et al. ........... 264/401 |
| 5,149,548 A | * | 9/1992 | Yamane et al. .......... 425/174.4 |
| 5,212,497 A | | 5/1993 | Stanley et al. ................. 347/14 |
| 5,555,176 A | * | 9/1996 | Menhennett et al. ........ 700/118 |
| 5,902,537 A | * | 5/1999 | Almquist et al. ........... 264/401 |
| 5,943,235 A | * | 8/1999 | Earl et al. ...................... 700/98 |
| 5,955,022 A | * | 9/1999 | Walker et al. .............. 264/400 |
| 6,029,896 A | * | 2/2000 | Self et al. ....................... 239/4 |
| 6,136,252 A | * | 10/2000 | Bedal et al. ................. 264/308 |
| 6,193,923 B1 | * | 2/2001 | Leyden et al. .............. 264/410 |

\* cited by examiner

*Primary Examiner*—William Grant
*Assistant Examiner*—Chad Rapp
(74) *Attorney, Agent, or Firm*—Ralph D'Alessandro; James E. Curry (57) ABSTRACT

A method, system and apparatus for forming a three-dimensional object on a layer-by-layer basis involves forming a portion of the three-dimensional object using selective deposition modeling (SDM). SDM involves using at least one orifice, such as a jet, which dispenses a droplet of a flowable material that solidifies upon being dispensed. A drop volume capability of each orifice is adjusted until substantially all orifices have a uniform drop volume capability and all dispensed droplets of the flowable material have a uniform volume.

25 Claims, 5 Drawing Sheets

METHOD AND APPARATUS FOR CONTROLLING THE DROP VOLUME IN A SELECTIVE DEPOSITION MODELING ENVIRONMENT

RELATED APPLICATION

The present application is a continuation-in-part of U.S. Pat. No. 5,943,235 issued Aug. 24, 1999, which is a continuation-in-part of U.S. patent application Ser. No. 08/534,813, filed Sep. 27. 1995, now abandoned.

FIELD OF THE INVENTION

This invention relates to the formation of three-dimensional objects on substantially a layer-by-layer basis with enhanced resolution. Preferred embodiments of the invention more particularly relate to controlling the drop volume in a selective deposition modeling environment.

BACKGROUND OF THE INVENTION

Related Art

Rapid Prototyping and Manufacturing (RP&M) is the name given to a field of technologies that can be used to form three-dimensional objects rapidly and automatically from three-dimensional computer data representing the objects. RP&M can be considered to include three classes of technologies: (1) Stereolithography; (2) Laminated Object Manufacturing; and (3) Selective Deposition Modeling.

The stereolithography class of technologies creates three-dimensional objects based on the successive formation of layers of a fluid-like medium adjacent to previously formed layers of medium and the selective solidification of those layers according to cross-sectional data representing successive slices of the three-dimensional object in order to form and adhere laminae. One specific stereolithography technology is known simply as stereolithography and uses a liquid medium which is selectively solidified by exposing it to prescribed stimulation. The liquid medium is typically a photopolymer and the prescribed stimulation is typically visible or ultraviolet electromagnetic radiation. Liquid-based stereolithography is disclosed in various patents, applications, and publications of which a number are briefly described in the Related Applications section hereinafter. Another stereolithography technology is known as Selective Laser Sintering (SLS). SLS is based on the selective solidification of layers of a powdered medium by exposing the layers to infrared electromagnetic radiation to sinter or fuse the particles. SLS is described in U.S. Pat. No. 4,863,538 issued Sep. 5, 1989 to Deckard. A third technology is known as Three-dimensional Printing (3DP) 3DP is based on the selective solidification of layers of a powdered medium which are solidified by the selective deposition of a binder thereon. 3DP is described in U.S. Pat. No. 5,204,055 issued Apr. 20, 1993 to Sachs. Another technique is called Multijet Modeling, MJM, and involves the selective deposition of droplets of material from multiple ink jet orifices to speed the building process. MJM is described in PCT Publication Nos. WO 97-11835 published Apr. 3, 1997 naming Leyden as an inventor and WO 97-11837 published Apr. 3, 1997 naming Earl as an inventor (both assigned to 3D Systems, Inc. as is the instant application).

Laminated Object Manufacturing, LOM, techniques involve the formation of three-dimensional objects by the stacking, adhering, and selective cutting of sheets of material, in a selected order, according to the cross-sectional data representing the three-dimensional object to be formed. LOM is described in U.S. Pat. No. 4,752,352 issued Jun. 21, 1988 to Feygin; and U.S. Pat. No. 5,015,312 issued May 14, 1991 to Kinzie, and in PCT Publication No. WO 95-18009 published Jul. 6, 1995 naming Morita as an inventor.

Selective Deposition Modeling, SDM, involves the build-up of three-dimensional objects by selectively depositing solidifiable material on a lamina-by-lamina basis according to cross-sectional data representing slices of the three-dimensional object. One such technique is called Fused Deposition Modeling, FDM, and involves the extrusion of streams of heated, flowable material which solidify as they are dispensed onto the previously formed laminae of the object. An example FDM process is described in U.S. Pat. No. 5,121,329 issued issued Jun. 9, 1992 to Crump. Another technique is called Ballistic Particle Manufacturing, BPM, which uses a 5-axis, ink-jet dispenser to direct particles of a material onto previously solidified layers of the object.

Example BPM processes are described in PCT publication numbers WO 96-12607 published May 2, 1996 listing Brown as an inventor; WO 96-12608 published May 2, 1996 listing Brown as an inventor; WO 96-12609 published May 2, 1996 listing Menhennett as an inventor; and WO 96-12610 published May 2, 1996 listing Menhennett as an inventor, all assigned to BPM Technology, Inc.

Preferred embodiments of the present invention are primarily directed to Selective Deposition Modeling methods, systems, and apparatuses. Specifically, embodiments of the present invention involve dispenser control for controlling the drop volume of a dispensed droplet of solidifiable material. Since the layers comprise droplets, the volume of a droplet is related to the volume of the layer. Several features of the Selective Deposition Modeling techniques are related to the volume of the layer.

Exemplary features are the time required for the layer to solidify or freeze, the cooling requirements of the layer, and the ease of welding numerous layers together. When dispensing layer after layer of solidifiable material, the dispenser may be required to wait between layers, to allow the most recently formed layer to sufficiently freeze before dispensing the next layer. For layers with large volumes, the dispenser may have to wait a long time until the previous layer freezes. For example, assume that one layer has a large volume and another layer has a small volume. Assuming both layers have the same properties (e.g., dispensing temperature, heat conductivity, freezing point, and support temperature, etc.) the layer with the larger volume will take longer to solidify than the layer with the smaller volume. To reduce the time required for the layer with the larger volume to solidify, cooling devices could be used to cool the layers. With regard to welding, sometimes the ability to unite layers is hampered when the volume of one layer is significantly larger (or smaller) than the volume of the other layers.

A technique used in Selective Deposition Modeling systems previously manufactured by 3D Systems, Inc. (the Assignee of the present invention) for controlling the drop volume of a dispensed droplet of solidifiable material, employed randomly controlling the jets. In particular, a print head was supplied hot melt material in a flowable state from a reservoir for selective jetting from the print head. The jets on the print head were computer controlled to selectively emit droplets of molten material when each orifice (i.e., jet) was appropriately located at desired locations of a build platform. The drop volume capability of each jet was also computer controlled. Specifically, a random number of jets was selected and the drop volume capability of the selected jets was controlled to produce a droplet that had a predetermined volume. For a single layer, this technique tended to produce a uniform drop volume within 10%. However, amongst layers, the drop volume was uniform approximately once every fifty layers.

SUMMARY OF THE INVENTION

It is an object of the present invention to provide simplified techniques (methods, systems, and apparatuses) for forming a three-dimensional object on a layer-by-layer basis by controlling the volume of a layer (or layers).

According to a first embodiment of the invention, a method, system and apparatus for forming a three-dimensional object on a layer-by-layer basis involves forming a portion of the three-dimensional object using Selective Deposition Modeling (SDM). Selective Deposition Modeling involves using at least one orifice, such as a jet, which dispenses a droplet of a flowable material that solidifies upon being dispensed. A drop volume capability of each orifice is adjusted until substantially all orifices have a uniform drop volume capability and all dispensed droplets of the flowable material have a uniform volume.

According to a second embodiment of the invention, a method, system, and apparatus for forming a three-dimensional object on a layer-by-layer basis also involves forming a portion of the three-dimensional object using selective deposition modeling, wherein at least one orifice is used. A first region of the formed portion is created, wherein the first region has a first deposition height and a first area deposition. A second region of the formed portion is created, wherein the second region has a second deposition height and a second area deposition. The first area deposition is different than the second area deposition. A drop volume capability of each orifice is adjusted until the first deposition height and the second deposition height are uniform.

According to a third embodiment of the invention, a method, system, and apparatus also involves forming a three-dimensional object on a layer-by-layer basis using selective deposition modeling, wherein a dispenser is used. A first region of the formed portion is created using a first group of orifices, and a second region of the formed portion is created using a second group of orifices. A drop volume capability of the first group of orifices and a drop volume capability of the second group of orifices is adjusted until the deposition height of the first region and a deposition height of the second region are uniform. Additionally, a drop volume capability of the first group of orifices and a drop volume capability of the second group of orifices is controlled until all dispensed droplets of the flowable material have a uniform volume.

Other aspects of the invention supply apparatuses for implementing the method aspects of the invention noted above.

Additional aspects of the invention will be clear from the embodiments of the invention described below in conjunction with the Figures associated therewith. Further aspects of invention involve the practice of the above referred to aspects of the invention in combination with one another.

BRIEF DESCRIPTION OF THE PREFERRED EMBODIMENT

As previously discussed, the subject application is directed to control system techniques for controlling jobs in a Selective Deposition Modeling (SDM) system. The detailed description of a preferred embodiment of the invention will begin with a description of a preferred Selective Deposition Modeling system wherein embodiment details will be described as appropriate.

Figure 1:
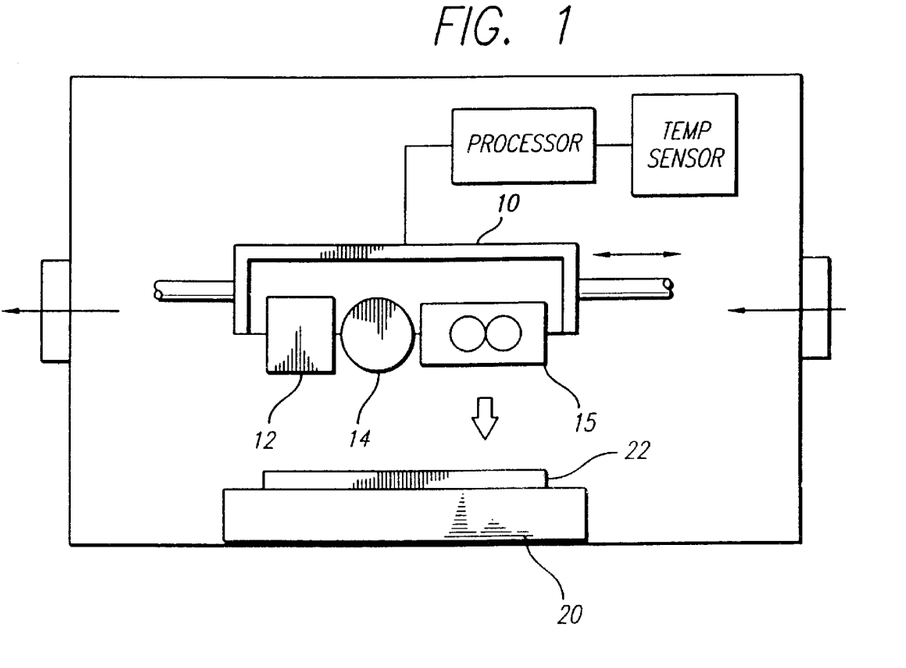
FIG. 1 illustrates a two-dimensional view of a preferred apparatus for performing Selective Deposition Modeling.

A preferred apparatus for performing Selective Deposition Modeling is illustrated in FIG. 1. The apparatus comprises a dispensing carriage 10 on which is situated dispensing head 12 (e.g. multi-orifice 16 ink jet head) and planarizer (e.g., a rotating and/or heated roller) 14. The dispensing carriage 10 is supported and drivable back and forth in the X-direction, also known as the main scanning direction, adjacent a build platform 20. The spacing between the head 12 and the dispensing carriage 10 in FIG. 1 is exaggerated for simplifying the present disclosure. In practice the spacing would be small enough to allow the planarizer 14 to contact material deposited on the build platform by the head 12. The motion of the dispensing carriage 10 is under the control of a suitable drive motor and a control computer or microprocessor 25.

Furthermore, at either side of the dispensing carriage 10 and/or between the planarizer 14 and dispensing head 12, one or more fans 15 for blowing air vertically down are mounted to help cool the dispensed material and substrate such that the desired building temperature is maintained. Of course other mounting schemes for the fans and/or other cooling systems are possible including the use of misting devices for directing vaporizable liquids (e.g. water, alcohol, or solvents) onto the surface of the object. Cooling systems might involve active or passive techniques for removing heat and may be computer controlled in combination with temperature sensing devices 23 to maintain the dispensed material within the desired building temperature range.

The dispensing head (also referred to as a print head or dispenser) 12 may be for example, a commercial print head configured for jetting color hot melt inks (e.g. thermal plastics or wax-like materials), and modified and/or controlled for use in a three-dimensional modeling system wherein the print head 12 undergoes back and forth movements and accelerations. In one example preferred embodiment, the head is a 352 jet multi-color commercial print head produced by Tektronix, Inc. One group of jets comprises four jets (not shown) which, in a color print head, would represent four colors. Three jets are on the same x-line, and one jet at the end of the sequence of four jets is positioned slightly off of this x-line (i.e., on a different y-dimension location from the other three jets).

The print head 12 is supplied hot melt material in a flowable state from a reservoir (not shown) for selective jetting from the print head. In a preferred implementation, all 352 jets on the print head 12 are computer controlled to selectively fire droplets when each orifice (i.e., jet) is appropriately located to dispense droplets onto desired locations of a build platform 20. In practice, commands are sent to each jet selectively commanding each one to fire (i.e., dispense a droplet) or not to fire (i.e., not to dispense a droplet) depending on jet position and desired locations for material deposition. Also, in practice, firing commands are preferably sent simultaneously to all jets. Thus, in a preferred embodiment, the head is computer controlled so as to selectively fire the jets, to simultaneously emit droplets of the molten material through one or more jets. Of course it will be appreciated that in alternative embodiments, heads with a different numbers of jets can be used, different firing frequencies are possible and, in appropriate circumstances, non-simultaneous firing of the jets is possible.

The print head 12 defines a pattern of orifice 16 corresponding in number to the number of jets. With respect to FIG. 1, the orifices are directed such that droplets of material are allowed to emit from the underside of the dispensing carriage 10. In a preferred embodiment, the dispensing head 12 (i.e., the array of orifices) is mounted at an angle to the main scanning direction (e.g. X-direction) and is configured with the N=352 individually controllable orifices, arranged in 88 groups of four jets.

Each dispenser (e.g., jet) is equipped with a piezoelectric element which causes a pressure wave to propagate through the material when an electric firing pulse is applied to the element in accordance with well known ink jet head technology. The pressure wave causes a drop of material to be emitted from orifice. The 352 dispensers are controlled by the control computer which controls the rate and timing of the firing pulses applied to the individual dispenser and therefore the rate and timing of droplets being emitted from the orifices.

One preferred embodiment uses raster scanning to position the print head and orifices to dispense material at desired drop locations. The printing process for each layer is accomplished by a series of relative movements between the head and the desired drop locations on the build platform or previously formed layer. Printing typically occurs as the head relatively moves in a main scanning direction. This is followed by a movement of the build platform 20 in a secondary scanning direction (i.e., y-direction), while the dispensing carriage 10 is moving in a reverse scanning direction (i.e., opposite x-direction from the direction of movement while dispensing) while no dispensing occurs. This is followed by another scan in the main scanning direction in which dispensing again occurs. Alternatively, dispensing may occur in both the forward and reverse x-direction. This process occurs repeatedly until the layer is completely deposited. The procedure is then repeated for each subsequent layer.

Other alternative embodiments may utilize vector scanning techniques or a combination of vector scanning and raster scanning. Other alternative embodiments may use substantially non-perpendicular main and secondary scanning directions along with techniques that result in proper placement of droplets.

In other alternative embodiments multiple prints heads may be used which lay end to end (extend in the secondary scanning direction) and/or which are stacked back to back (stacked in the main scanning direction). When stacked back to back the print heads may have orifices aligned in the main scanning direction so that they print over the same lines or alternatively they may be offset from one another so as dispense material along different main scanning lines. In particular, it may be desirable to have the back to back print heads offset from each other in the secondary scanning direction by the desired raster line spacing to minimize the number of main scanning passes that must occur. In other alternative embodiments the data defining deposition locations may not be located by pixels defining a rectangular grid but instead may be located by pixels laid out in some other pattern (e.g. offset or staggered pattern). More particularly, the deposition locations may be fully or partially varied from layer to layer in order to perform partial pixel drop location offsetting for an entire layer or for a portion of a layer based on the particulars of a region to be jetted.

With reference to FIG. 1, planarizer 14 comprises a heated rotating cylinder with a smooth surface. Its function is to melt, transfer and remove portions of the most recently dispensed layer of material, to smooth it out, to set a desired thickness for the last formed layer, and to set the net upper surface of the last formed layer to a desired level (i.e. the desired working surface or working level for forming a next lamina of the object). Numeral 22 identifies a layer of material which has just been deposited by the print head. The rotating cylinder planarizer 14 is mounted to the dispensing carriage 10 such that it is allowed to project from the underside of the platform by a sufficient amount in the Z-direction such that it contacts material 22 on build platform 20 at a desired level below the orifice plate (the spacing between the planarizer 14 and material 22 is exaggerated in FIG. 1, to more clearly show elements of the system).

The rotation of the planarizer cylinder sweeps material from the just-deposited layer, leaving a smooth surface. The just-deposited material adheres to the smooth, heated surface of the cylinder and is displaced until it contacts a wiper (not shown). The wiper is disposed to effectively "scrape" the material from the surface of the cylinder. This material, which is still flowable, is either disposed of or recycled.

With reference to FIG. 1, build platform 20 defines a surface on which is built the three-dimensional object or part layer-by-layer. This platform 20 is preferably supported for movement and driven back and forth in the Y-direction (i.e., index direction or secondary scanning direction) under computer control. The build platform also is supported for movement and is driven up and down (typically progressively downward during the build process) in the Z-direction under computer control.

Figure 2:
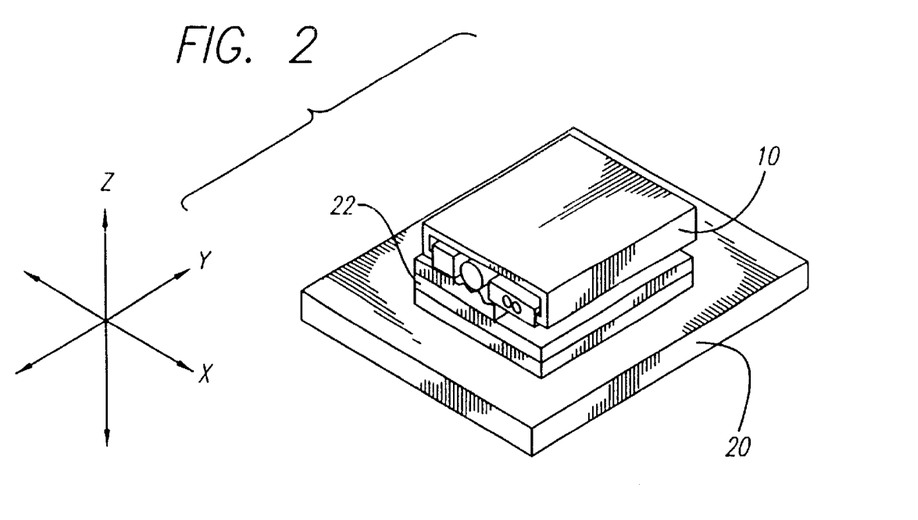
FIG. 2 illustrates a three-dimensional view of a build platform.

FIG. 2 illustrates another view of a build platform 20. A three-dimensional object 22 is being built, layer-by-layer, on the build platform 20. As hot melt is deposited onto the build platform 20, the deposition builds layers of a three-dimensional object. The layers form an object 22 in three-dimensions (X, Y, and Z).

To build a cross-section of a part, the build platform 20 moves in the Z-direction relative to the print head 12, such that the last-built (i.e., dispensed and possibly planed) layer of the part is situated an appropriate amount below the orifice plate 18 of the print head 12. The print head 12 is moved one or more times over the XY build region (the head sweeps back and forth in the X direction, while the Y-stage translates the partially formed object in the Y-direction). The combination of the last formed layer of the object and any supports associated therewith define the working surface for deposition of the next lamina and any supports associated therewith. During translation in the XY directions, the jets of the print head are fired in a registered manner with previously dispensed layers to deposit material in a desired pattern and sequence for the building of the next lamina of the object. During the dispensing process, a portion of the dispensed material is removed by the planarizer in the manner discussed above. The X, Y and Z movements, dispensing, and planarizing are repeated to build up the object from a plurality of selectively dispensed and adhered layers. In an alternative embodiment the step of planarization could be performed independently of the dispensing steps. In other alternative embodiments the planarizer may not be used on all layers but instead may be used on selected or periodic layers.

As noted previously, in a preferred embodiment, the print head is directed to trace a raster pattern. The raster pattern consists of a series of raster lines, R(1), R(2), . . . , R(N), running in the X-direction or main scanning direction and arrayed along the Y-direction (i.e. index direction or secondary scanning direction). The raster lines are spaced from one another by a distance dr, which, in a preferred embodiment, is 1/300 inches (about 3.3 mils or about 83.8 µm).

This is accomplished by following a two-step process. The first step includes alternating main scanning direction passes with secondary scanning direction movements of an amount equal to the desired raster line resolution until all raster lines between initial lines dispensed by two adjacent jets are scanned. Thereafter, a second step includes a large index direction increment is made. The first and second steps are repeated until the indexing direction increments, and lines scanned, are sufficient to deposit material on all raster lines required to form the object layer or cross-section (including any necessary supports for forming subsequent cross-sections).

The firing of the ink jet orifices is controlled by a rectangular bit map maintained in a control computer or other memory device. The bit map consists of a grid of memory cells, in which each memory cell corresponds to a pixel of the working surface, and in which the rows of the grid extend in the main scanning direction (X-direction) and the columns of the grid extend in the secondary scanning direction (Y-direction). The width of (or distance between) the rows (spacing along the Y-direction) may be different from the width (or length of or distance between ) of the columns (spacing along the X-direction) dictating that different data resolutions may exist along the X and Y directions. In alternative embodiments, non-uniform pixel size is possible within a layer or between layers wherein one or both of the pixel width or length is varied by pixel position. In other alternatives, other pixel alignment patterns are possible. For example, pixels on adjacent rows may be offset in the main scanning direction by a fractional amount of the spacing between pixels in the main scanning direction so that is their center points do not align with the center points of the pixels in the neighboring rows. This fractional amount may be ½ so that their center points are aligned with the pixel boundaries of adjacent rows. It may be ⅓ or some other amount such that two or more intermediate rows of pixels are located between rows where pixels are realigned in the main scanning direction. In further alternatives, pixel alignment might be dependent on the geometry of the object or support structure being dispensed. For example, it might be desirable to shift pixel alignment when forming a portion of a support pattern that is supposed to bridge a gap between support columns. These and other alternative pixel alignment schemes can be implemented by modifying the pixel configuration or alternatively defining a higher resolution pixel arrangement (in X and/or Y) and using pixel firing patterns that do not fire on every pixel location but instead fire on selected spaced pixel locations which may vary according to a desired random, predetermined or object basis pattern.

The data resolution in the main scanning direction may be defined in terms of Main Direction Pixels (MDPs). MDPs may be described in terms of pixel length or in terms of number of pixels per unit length. In a preferred embodiment MDP=300 pixels per inch (3.3 mils/pixel or 677.4 µm/pixel). In other preferred embodiments MDP=1200 pixels per inch. Similarly the data resolution in the secondary scanning direction may be defined in terms of Secondary Direction Pixels (SDPs) and the SDPs may be described in terms of pixel width or in terms of number of pixels per unit length. In a preferred embodiment SDP=MDP=300 pixels per inch (3.3 mils/pixel or 677.4 µm/pixel). The SDP may or may not be equivalent to spacing between raster lines and the MDP may or may not be equivalent to the spacing between successive drop locations along each raster line. The spacing between successive raster lines may be defined as Secondary Drop Locations (SDLs), while spacing between successive drop locations along each raster line may be defined as Main Drop Locations (MDLs). Similar to SDPs and MDPs, SDLs and MDLs may be defined in terms of drops per unit length or drop spacing.

If SDP=SDL there is a one to one correspondence between data and drop locations along the secondary scanning direction and the pixel spacing is equal to that of the raster line spacing. If MDP=MDL there is a one to one correspondence between data and drop locations along the main scanning direction.

If SDL and/or MDL is larger than SDP and MDP, respectively, more drops will need to be fired than that for which data exists, thus each pixel will need to be used in causing more than one droplet to be dispensed. The dispensing of these extra droplets can be done in one of two ways, either by dispensing the droplets at intermediate points between the centers of successive pixels (i.e. intermediate dropping, "ID") or alternatively directly on top of pixel centers (i.e. direct dropping, "DD"). In either case this technique is called "overprinting" and results in faster build up of material and eases mechanical design constraints involving maximum scan speeds and acceleration rates since the same Z-build up can occur while moving the print head and/or object more slowly.

If SDL and/or MDL is less than SDP and/or MDP, respectfully, drops will be fired at fewer locations than those for which data exists, at least for a given pass of the print head. This data situation may be used to implement the offset pixel and/or non-uniform sized pixel techniques discussed above.

To build a cross-section, the bit map is first loaded with data representative of the desired cross-section (as well as any supports which are desired to be built). Assuming, as with the preferred embodiment, a single build and support material is being used, if it is desired to deposit material at a given pixel location, then the memory cell corresponding to that location is appropriately flagged (e.g. loaded with a binary "1") and if no material is to be deposited an opposite flag is used (e.g. a binary "0"). If multiple materials are used, cells corresponding to deposition sites are flagged appropriately to indicate not only drop location sites but also the material type to be deposited. For ease of data handling, compressed data defining an object or support region (e.g. on-off location points along each raster line) can be booleaned with a fill pattern description to be used for the particular region to derive a final bit map representation used for firing the dispensing jets. The raster lines making up the grid are then assigned to individual orifices in the manner described earlier. Then, a particular orifice is directed to fire or not over a pixel depending on how the corresponding cell in the bit map is flagged.

Figure 3:
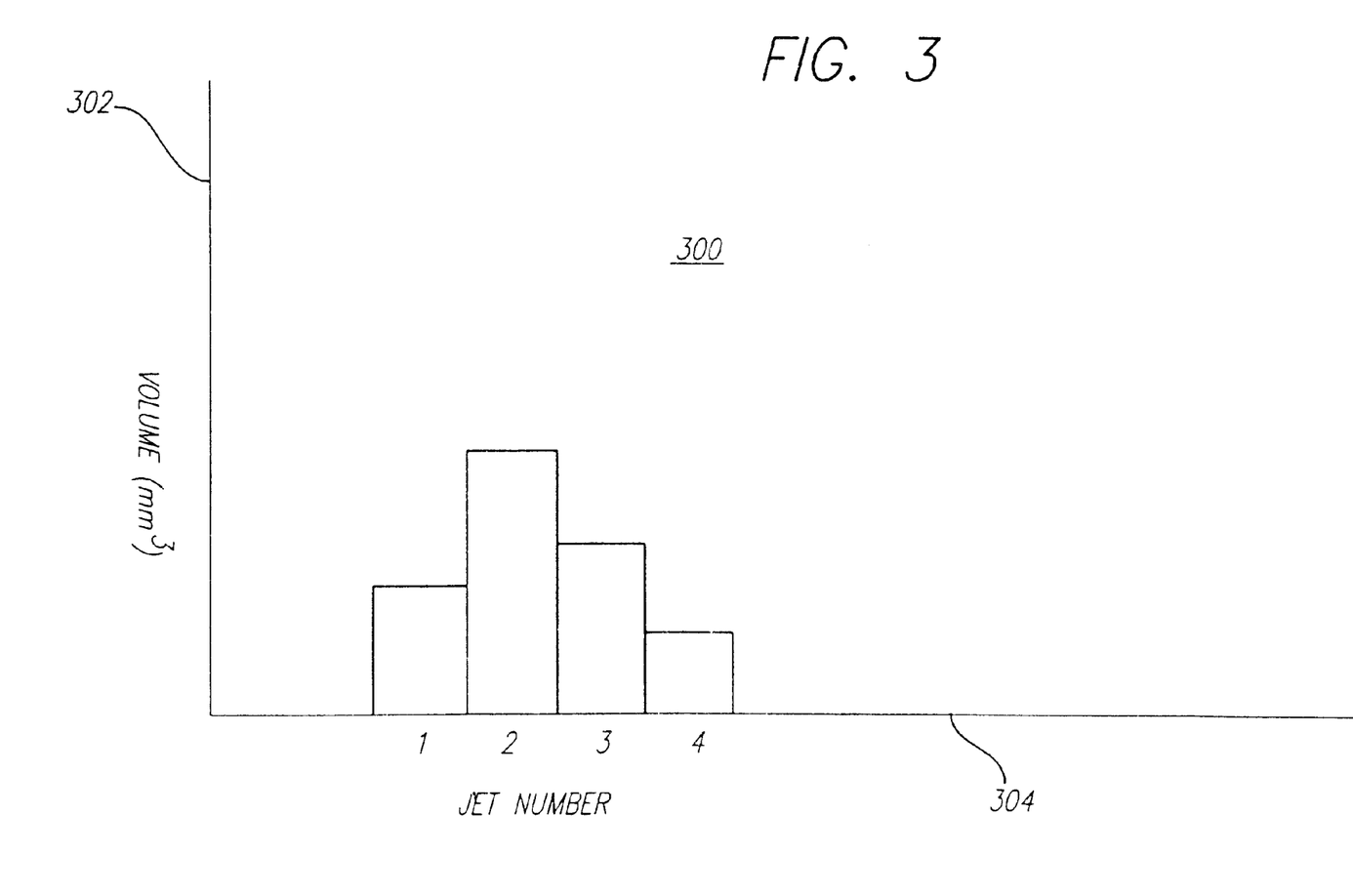
FIG. 3 illustrates exemplary drop volumes in accordance with the present invention.

The first through third preferred embodiments of the instant invention involve controlling the volume of a layer (or layers) by adjusting the drop volume capability of a jet. The volume can be detected by an optical sensor (or by other volume sensing devices). Each jet has the ability to dispense droplets with varying volumes. FIG. 3 shows an exemplary chart 300 of drop volumes for jets 1–4. The y-axis 302 represents the drop volume in cubic millimeters and the x-axis 304 represents a jet number. In this example, the drop volume is nonuniform, with jet 2 producing the largest volume.

FIG. 1 depicts a representative example apparatus and system for processes according to the first through third preferred embodiment of the instant invention. These embodiments use jets that are computer controlled to selectively emit droplets of solidifiable material when each jet is appropriately located at desired location of a build platform 20.

In a first embodiment of the instant invention, the drop volume capability of each jet is adjusted until all droplets of solidifiable material have a uniform volume. Since the layers comprise droplets, the volume of a droplet is related to the volume of the layer. The droplets may be uniform within one layer or the droplets may be uniform amongst all layers. Droplets that are uniform amongst raster lines tend to provide a stable welding environment. In alternative configurations of the first embodiment, the volume of the droplets are uniform within 10%; within 5%; and within 2%.

Figure 4:
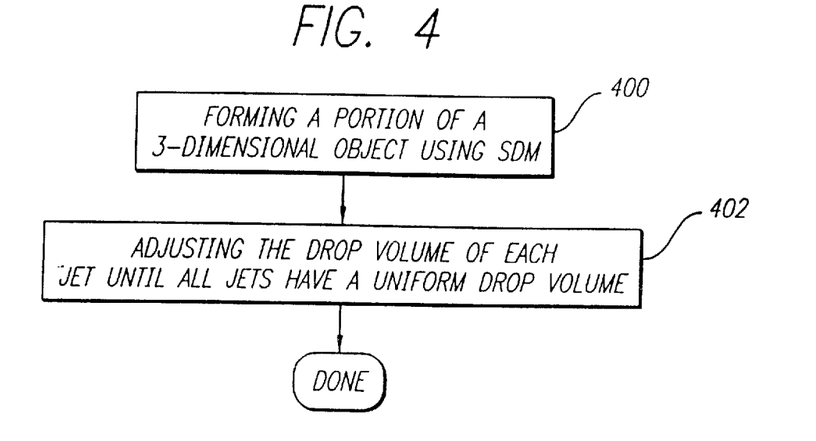
FIG. 4 is a flowchart that illustrates the steps performed according to a first embodiment of the present invention.

FIG. 4 is a flow chart illustrating the steps performed by the first embodiment of the present invention. Block 400 represents the first embodiment forming a portion of a three-dimensional object using Selective Deposition Modeling. The drop volume capability of each is then adjusted until all jets have a uniform drop volume capability, as represented by block 402.

In another configuration, the drop volume is adjusted using a control voltage pulse shape. Each jet is equipped with a piezoelectric element which causes a pressure wave to propagate through the material when an electric firing pulse (i.e., a control voltage pulse shape) is applied to the element in accordance with well known ink jet print head technology. The pressure wave causes a drop of material to be emitted from jet.

In a further configuration, the drop volume capability of each jet is adjusted based on a predetermined drop volume capability. For example, the drop volume capability may be based on test runs or simulations of the Selective Deposition Modeling process. During these tests or simulations, a drop volume capability that produced droplets with uniform volumes is identified. Each jet is then calibrated with respect to the predetermined drop volume.

A second preferred embodiment is similar to the first embodiment with the exception that the drop volume capability of each jet is adjusted until the droplets of solidifiable material have uniform deposition heights. Specifically, each jet is adjusted until at least two regions with different deposition patterns have uniform deposition heights.

Since the layers comprise droplets, the deposition height of the droplets is related to the top (or bottom) surfaces of the layer. In particular, a layer that comprises droplets with varying deposition heights may have an uneven top (or bottom) surface. On the other hand, a layer that comprises droplets with uniform deposition heights may have a even top (or bottom) surface. The even surface can reduce the time required to build a three-dimensional object because the layers are thicker. The deposition height may be uniform within one layer or the deposition height may be uniform amongst all layers. In alternative configurations of the first embodiment, the deposition heights of the droplets are uniform within 10%; within 5%; and within 2%.

Figure 5:
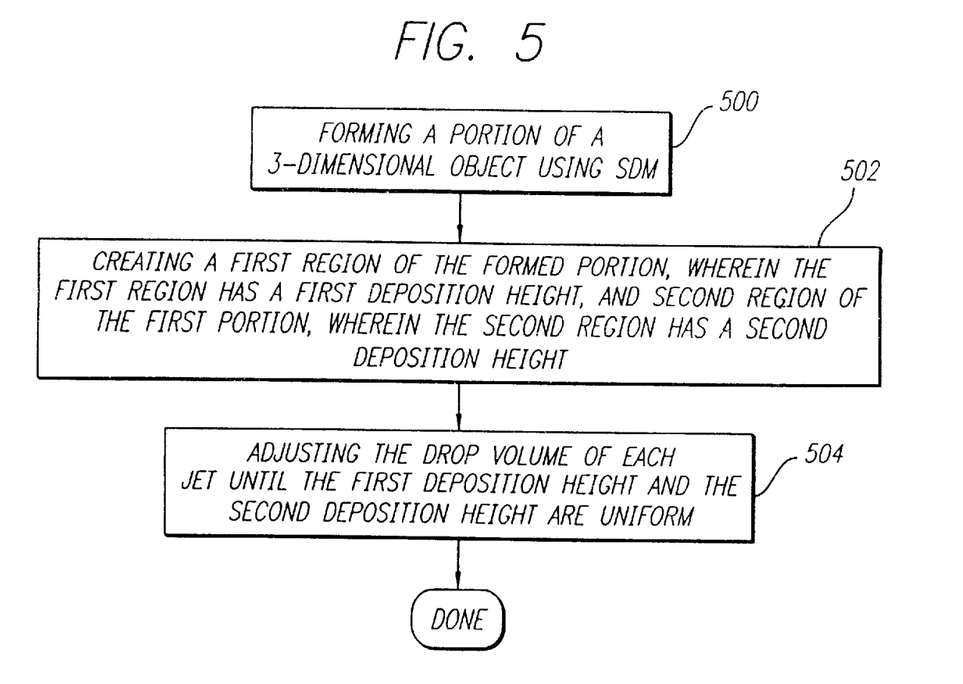
FIG. 5 is a flowchart that illustrates the steps performed according to a second embodiment of the present invention.

FIG. 5, is a flow chart illustrating the steps performed by the second embodiment of the present invention. Block 500 represents the first embodiment forming a portion of a three-dimensional object using Selective Deposition Modeling. A first region of the formed portion is created as represented by block 502. The first region has droplets of solidifiable material that have a first deposition height. A second region of the formed portion is also created. The second region has droplets of solidifiable material that have a second deposition height. The drop volume capability of each jet is adjusted until the first deposition height and the second deposition height are uniform, as represented by block 504.

In another configuration, the drop volume capability is adjusted using a control voltage pulse shape. As discussed above, each jet is equipped with a piezoelectric element which causes a pressure wave to propagate through the material when an electric firing pulse (i.e., a control voltage pulse shape) is applied to the element in accordance with well known ink jet head technology. The pressure wave causes a drop of material to be emitted from jet.

In a further configuration, the drop volume capability of each jet is adjusted based on a predetermined drop volume capability. For example, the drop volume capability may be based on test runs or simulations of the Selective Deposition Modeling process. During these tests or simulations, a drop volume capability that produces droplets with uniform deposition heights is identified. Each jet is calibrated with respect to the predetermined drop volume capability.

Figure 6:
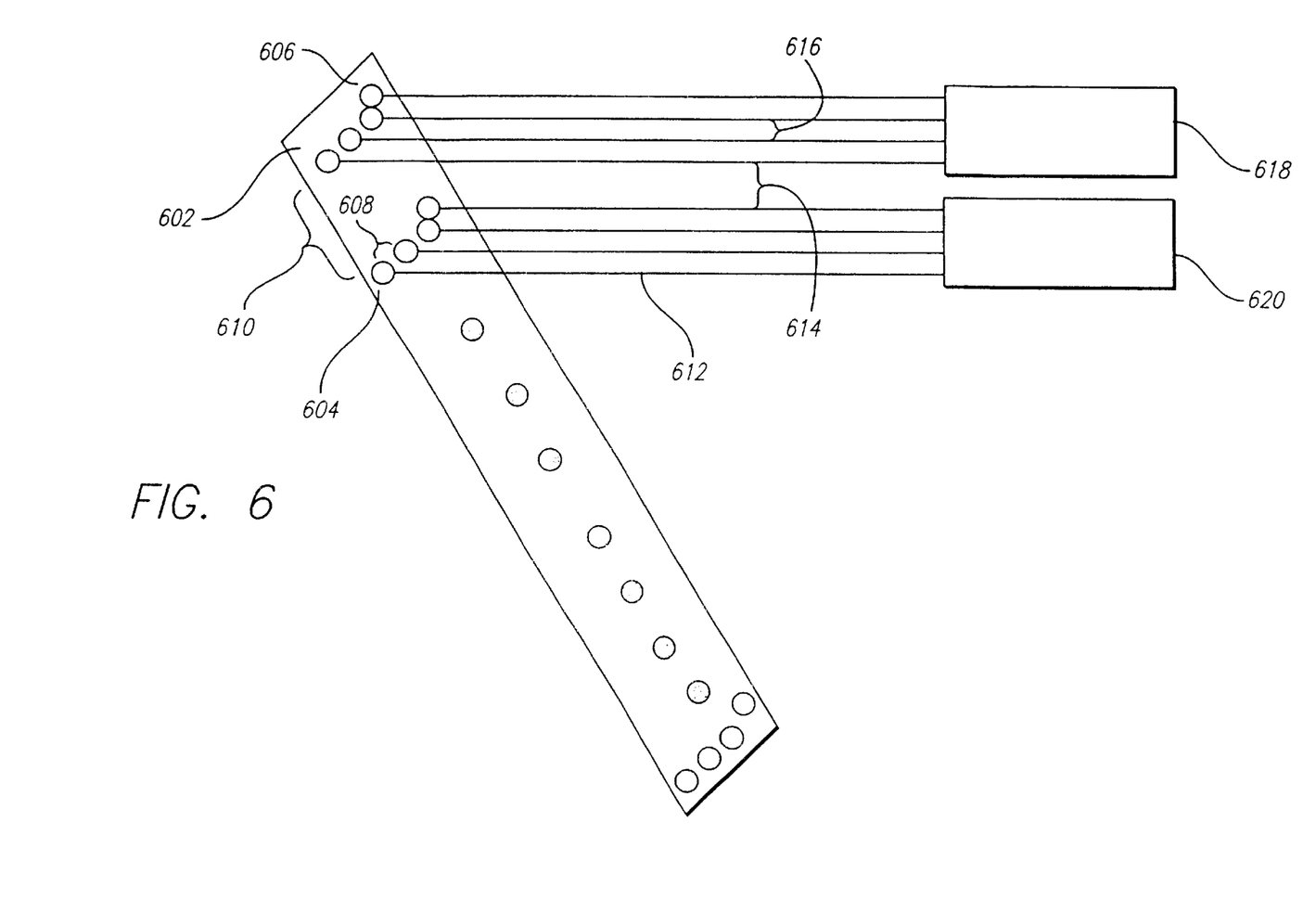
FIG. 6 illustrates exemplary groups of jets in accordance with the present invention.

The third preferred embodiment is a combination of the first and second embodiment with the exception that a first group of jets produces the first region and a second group of jets produces the second region. As discussed herein, a group of jets is defined as a plurality of jets that are arranged at a closer spacing to each other than to any jet in any adjacent group. FIG. 6 displays exemplary groups of jets. Spacing between Jet group one 602 and Jet group two 604 is exaggerated for simplifying the present disclosure. Jet group one 602 and Jet group two 604 each have four jets 606 that are arranged with close spacing 608. As shown, a larger spacing 610 exists between the jets in jet group one 602 and the jets in jet group two 604.

The spacing between the raster lines 612 covered by the jets 606 is related to how the jets 606 are arranged. For example, a large raster line space 614 exists between jets in Jet group one 602 and jets in Jet group two 604. A small raster line space 616 exists for jets in the same group.

In accordance with the third embodiment, each jet in each group is adjusted until the deposition heights of the droplets in the first region (e.g., numeral 618) and the deposition heights of the droplets in the second region (e.g., numeral 620) are uniform. The deposition height may be uniform within one layer or the deposition height may be uniform amongst all layers. Additionally, the drop volume capability of each jet is controlled until all droplets of material have a uniform volume. In alternative configurations of the third embodiment, the droplets of solidifiable material have volumes that are uniform within 10%; within 5%; and within 2%.

Figure 7:
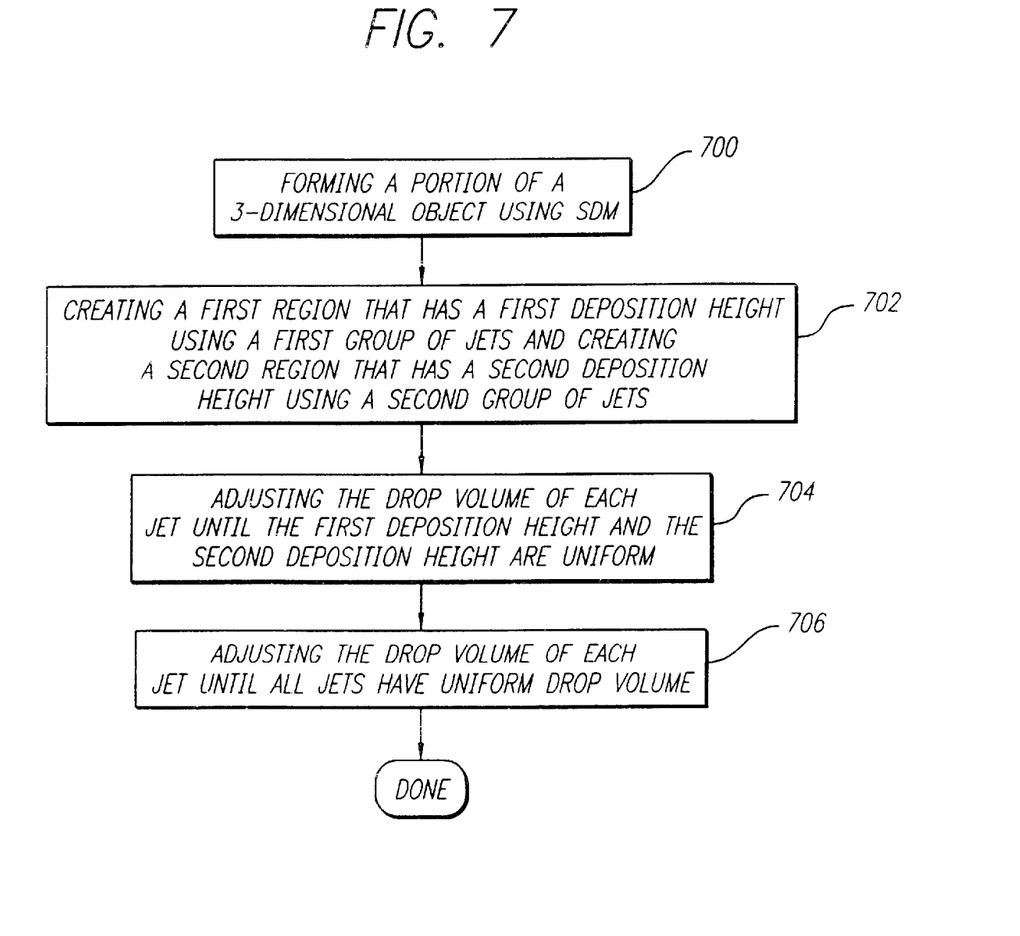
FIG. 7 is a flowchart that illustrates the steps performed according to a third embodiment of the present invention.

FIG. 7, is a flow chart illustrating the steps performed by the second embodiment of the present invention. Block 700 represents the first embodiment forming a portion of a three-dimensional object using Selective Deposition Modeling. A first group of jets is created, wherein the first group of jets produce the first region of the formed portion. A second group of jets is also created, wherein the second group of jets produce the second region of the formed portion, as represented by 702. The drop volume capability of each jet in each group is adjusted until the first deposition height and the second deposition height are uniform, as represented by block 704. The drop volume capability of each jet is then adjusted until all jets have a uniform drop volume capability, as represented by block 706.

In another configuration, the drop volume is adjusted using a control voltage pulse shape. As discussed above, each jet is equipped with a piezoelectric element which causes a pressure wave to propagate through the material when an electric firing pulse (i.e., a control voltage pulse shape) is applied to the element in accordance with well known ink jet print head technology. The pressure wave causes a drop of material to be emitted from jet.

In a further configuration, the drop volume capability of each jet is adjusted based on a predetermined drop volume capability. For example, the drop volume capability may be based on test runs or simulations of the Selective Deposition Modeling process. During these tests or simulations, a drop volume capability that produced droplets with uniform deposition heights and uniform volumes is identified. Each jet is calibrated with respect to the predetermined drop volume capability.

We claim:

1. A method of forming a three-dimensional object on a layer-by-layer basis using a selective deposition modeling process wherein selective deposition involves using at least one orifice which dispenses a droplet of flowable material that solidifies upon being dispensed, comprising the steps of:
    detecting the drop volume capability of each orifice;
    forming a portion of the three-dimensional object;
    determining a predetermined drop volume capability of each orifice based upon a pre-determined drop volume capability produced by a simulation of the selective deposition modeling process;
    comparing the predetermined drop volume capability with the detected drop volume of each orifice; and
    adjusting a drop volume capability of each orifice until substantially all orifices have a uniform drop volume capability and all dispensed droplets of the flowable material have a uniform volume.

2. The method of claim 1, wherein the step of adjusting further comprises adjusting the drop volume capability of each orifice until all orifices have a uniform drop volume capability within 10%.

3. The method of claim 1, wherein the step of adjusting comprises adjusting the drop volume capability of each orifice until all orifices have a uniform drop volume capability within 5%.

4. The method of claim 1, wherein the step of adjusting comprises adjusting the drop volume capability of each orifice until all orifices have a uniform drop volume capability within 2%.

5. The method of claim 1, wherein the step of adjusting comprises adjusting the drop volume capability of each orifice using a control voltage pulse shape.

6. The method of claim 1, wherein the step of adjusting further comprises adjusting a drop volume capability of each orifice until substantially all orifices have uniform drop volume capabilities within all layers.

7. The method of claim 1, wherein the step of adjusting further comprises adjusting a drop volume capability of each orifice until substantially all orifices have uniform drop volume capabilities and each dispensed droplet of a flowable material has a uniform volume within all layers.

8. The method of claim 1, wherein the step of adjusting further comprises adjusting a drop volume capability of each orifice until substantially all orifices have uniform drop volume capabilities and each dispensed droplet of a flowable material has a uniform volume within a layer.

9. The method of claim 1, wherein the step of adjusting further comprises adjusting a drop volume capability of each orifice until substantially all orifices have uniform drop volume capabilities and each dispensed droplet of a flowable material has a uniform volume within all layers.

10. A method of forming a three-dimensional object, comprising the steps of:
    forming a portion of the three-dimensional object on a layer-by-layer basis using selective deposition modeling, wherein selective deposition modeling involves using at least one orifice which dispenses a droplet of a flowable material that solidifies upon being dispensed;
    creating a first region of the formed portion, the first region having a first deposition height and a first area deposition, and a second region of the formed portion, the second region having a second deposition height and a second area deposition, wherein the first area deposition is different than the second area deposition; and
    adjusting a drop volume capability of each orifice until the first deposition height and the second deposition height are uniform.

11. The method of claim 10, wherein the step of adjusting further comprises adjusting a drop volume capability of each orifice until the first deposition height and the second deposition height are uniform within 10%.

12. The method of claim 10, wherein the step of adjusting further comprises adjusting a drop volume capability of each orifice until the first deposition height and the second deposition height are uniform within 5%.

13. The method of claim 10, wherein the step of adjusting further comprises adjusting the drop volume capability of each orifice until the first deposition height and the second deposition height are uniform within 2%.

14. The method of claim 10, wherein the step of adjusting comprises adjusting the drop volume capability of each orifice using a control voltage pulse shape to dispense each droplet of the flowable material.

15. The method of claim 10, comprises adjusting the drop volume capability of each orifice based on a pre-determined drop volume capability, wherein the pre-determined drop volume capability is produced by a simulation of the selective deposition modeling process.

16. The method of claim 15, wherein the step of adjusting further comprises the steps of:
    before forming the portion of the three-dimensional object, detecting the drop volume capability of each orifice;
    comparing the detected drop volume capability of each orifice to the predetermined drop volume capability; and
    calibrating the detected drop volume capability of each orifice based on the comparison.

17. The method of claim 15, wherein the step of adjusting further comprises adjusting a drop volume capability of each orifice until substantially all orifices have uniform drop volume capabilities within a layer.

18. A method of forming a three-dimensional object, comprising the steps of:

forming a portion of the three-dimensional object on a layer-by-layer basis using selective deposition modeling, wherein selective deposition modeling involves using at least one orifice which dispenses a droplet of a flowable material that solidifies upon being dispensed;

creating a first region of the formed portion using a first group of orifices, and a second region of the formed portion using a second group of orifices;

adjusting a drop volume capability of the first group of orifices and a drop volume capability of the second group of orifices until a deposition height of the first region and a deposition height of the second region are uniform; and controlling a drop volume capability of the first group of orifices and a drop volume capability of the second group of orifices until all dispensed droplets of the flowable material have a uniform volume.

19. The method of claim 18, wherein the step of controlling further comprises controlling the drop volume capability of each orifice until all dispensed droplets of the flowable material have a uniform volume within 10%.

20. The method of claim 18, wherein the step of controlling further comprises controlling the drop volume capability of each orifice until all dispensed droplets of the flowable material have a uniform volume within 5%.

21. The method of claim 18, wherein the step of controlling further comprises controlling the drop volume capability of each orifice until all dispensed droplets of the flowable material have a uniform volume within 2%.

22. The method of claim 18, wherein the step of adjusting comprises adjusting the drop volume capability of each orifice using a control voltage pulse shape.

23. The method of claim 18, wherein the step of adjusting comprises adjusting the drop volume capability of each orifice based on a pre-determined drop volume capability, wherein the pre-determined drop volume capability is produced by a simulation of the selective deposition modeling process.

24. The method of claim 23, wherein the step of adjusting further comprises the steps of:

before forming the portion of the three-dimensional object, detecting the drop volume capability of each orifice;

comparing the detected drop volume capability of each orifice to the predetermined drop volume capability; and calibrating the detected drop volume capability of each orifice based on the comparison.

25. The method of claim 18, wherein the step of adjusting further comprises adjusting a drop volume capability of each orifice until substantially all orifices have uniform drop volume capabilities and each dispensed droplet of a flowable material has a uniform volume within a layer.

* * * * *

UNITED STATES PATENT AND TRADEMARK OFFICE
CERTIFICATE OF CORRECTION

PATENT NO.    : 6,347,257 B1  Page 1 of 1
DATED         : February 12, 2002
INVENTOR(S)   : Bryan J. L. Bedal et al.

It is certified that error appears in the above-identified patent and that said Letters Patent is hereby corrected as shown below:

<u>Column 6,</u>
Line 39, "build platform also" should read -- build platform 20 also --.

<u>Column 7,</u>
Line 7, "that is their center" should read -- that their center --.

Signed and Sealed this

Thirteenth Day of May, 2003

JAMES E. ROGAN
*Director of the United States Patent and Trademark Office*